United States Patent
Kuroda et al.

(10) Patent No.: US 10,071,614 B2
(45) Date of Patent: Sep. 11, 2018

(54) VEHICLE AIR CONDITIONER (71) Applicant: Panasonic Intellectual Property Management Co., Ltd., Osaka (JP)

(72) Inventors: Kentaro Kuroda, Kanagawa (JP); Yoshitoshi Noda, Kanagawa (JP); Katsuji Taniguchi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 129 days.

(21) Appl. No.: 14/903,569

(22) PCT Filed: Jul. 23, 2014

(86) PCT No.: PCT/JP2014/003866
§ 371 (c)(1),
(2) Date: Jan. 7, 2016

(87) PCT Pub. No.: WO2015/011918
PCT Pub. Date: Jan. 29, 2015

(65) Prior Publication Data
US 2016/0159203 A1    Jun. 9, 2016

(30) Foreign Application Priority Data

Jul. 26, 2013   (JP) .................. 2013-155184

(51) Int. Cl.
*F25B 13/00*   (2006.01)
*B60H 1/32*   (2006.01)
(Continued)

(52) U.S. Cl.
CPC ....... *B60H 1/3204* (2013.01); *B60H 1/00007* (2013.01); *B60H 1/00899* (2013.01);
(Continued)

(58) Field of Classification Search
CPC .............. B60H 1/3204; B60H 1/00007; B60H 1/0005; B60H 2001/00142; B60H 1/08;
(Continued)

(56) References Cited

U.S. PATENT DOCUMENTS 5,641,016 A * 6/1997 Isaji .................. B60H 1/00007
165/43
6,705,101 B2 * 3/2004 Brotz ....................... B60H 1/00
62/198

(Continued)

FOREIGN PATENT DOCUMENTS

JP   6-143974   5/1994
JP   10-076837   3/1998
(Continued)

OTHER PUBLICATIONS

International Search Report of PCT application No. PCT/JP2014/003866 dated Nov. 4, 2014.

*Primary Examiner* — Len Tran
*Assistant Examiner* — Kamran Tavakoldavani
(74) *Attorney, Agent, or Firm* — Pearne & Gordon LLP (57) ABSTRACT

This vehicle air conditioner includes: a component temperature-adjustment path in which a coolant flows for performing a heat exchange with a vehicle component which needs a temperature adjustment; an engine coolant path in which an engine coolant guided from an engine cooling portion flows; a heater core. The vehicle air conditioner further includes: a first water-refrigerant heat exchanger which performs a heat exchange between a low-temperature and low-pressure refrigerant of a heat pump, the coolant fed to the component temperature-adjustment path, and the engine coolant; a second water-refrigerant heat exchanger which performs a heat exchange between a high-temperature and high-pressure refrigerant of the heat pump, and the engine coolant; and a first switch which can switch between a state
(Continued)

where the engine coolant flows to the first water-refrigerant heat exchanger and a state where the refrigerant bypasses the first water-refrigerant heat exchanger.

14 Claims, 3 Drawing Sheets

(51) Int. Cl.
 *B60K 11/02* (2006.01)
 *B60H 1/00* (2006.01)
 *F25B 5/02* (2006.01)
 *F25B 41/04* (2006.01)
 *B60K 1/00* (2006.01)

(52) U.S. Cl.
 CPC .............. *B60K 11/02* (2013.01); *F25B 5/02* (2013.01); *F25B 41/04* (2013.01); *B60H 2001/00928* (2013.01); *B60K 2001/005* (2013.01); *F25B 2339/047* (2013.01)

(58) Field of Classification Search
 CPC ... B60H 1/02; B60H 1/03; B60H 1/04; B60H 2001/00307; B60H 1/00899; F25B 5/02; F25B 2313/02731; F25B 2400/13; F25B 25/005; F25B 2339/047
 See application file for complete search history.

(56) References Cited

U.S. PATENT DOCUMENTS

| | | | |
|---|---|---|---|
| 2001/0052238 A1 | 12/2001 | Burk et al. | |
| 2002/0043413 A1 | 4/2002 | Kimishima et al. | |
| 2010/0281901 A1* | 11/2010 | Kawase | B60H 1/00885 62/238.7 |
| 2012/0017637 A1 | 1/2012 | Nakajo et al. | |
| 2012/0253573 A1* | 10/2012 | Shigyo | B60H 1/00421 701/22 |
| 2013/0059191 A1* | 3/2013 | Hirota | H01M 10/615 429/120 |
| 2014/0041826 A1* | 2/2014 | Takeuchi | B60L 1/02 165/10 |

FOREIGN PATENT DOCUMENTS

| | | |
|---|---|---|
| JP | 2000-108640 | 4/2000 |
| JP | 2002-191104 | 7/2002 |
| JP | 2006-321389 | 11/2006 |
| JP | 2010-159008 | 7/2010 |

* cited by examiner

VEHICLE AIR CONDITIONER

TECHNICAL FIELD

The present disclosure relates to a vehicle air conditioner.

BACKGROUND

Unexamined Japanese Patent Publication No. 10-76837 discloses a vehicle air conditioner which can enhance heating performance compared to a conventional vehicle air conditioner. The vehicle air conditioner of Unexamined Japanese Patent Publication No. 10-76837 is based on a conventional hot water heater and adding a configuration of heating coolant of a hot water heater by using a heat pump.

SUMMARY

A vehicle air conditioner according to one aspect of the present disclosure employs a configuration including: a component temperature-adjustment path in which a coolant flows for performing a heat exchange with a vehicle component which needs a temperature adjustment; an engine coolant path in which an engine cooling portion flows; a heater core, in which the engine coolant flowing in the engine coolant path flows, for heating air to be fed to an interior of the vehicle. The configuration further includes: a first water-refrigerant heat exchanger which performs a heat exchange among a low-temperature and low-pressure refrigerant of a heat pump, the coolant fed to the component temperature-adjustment path, and the engine coolant flowing in the engine coolant path; a second water-refrigerant heat exchanger which performs a heat exchange between a high-temperature and high-pressure refrigerant of the heat pump, and the engine coolant flowing in the engine coolant path; and a first switch which can switch between a state where the engine coolant flowing in the engine coolant path flows to the first water-refrigerant heat exchanger and a state where the refrigerant bypasses the first water-refrigerant heat exchanger.

DESCRIPTION OF EMBODIMENT

Prior to the description of an exemplary embodiment of the present disclosure, problems intend to solve are described as follows.

A component such as an in-vehicle battery whose temperature needs to be adjusted is mounted on a vehicle. It is considered that the component whose temperature needs to be adjusted may be cooled by providing a component temperature-adjustment path in which a coolant flows for performing a heat exchange with a component, which needs a temperature adjustment, of a vehicle, and passing through an evaporator of a heat pump disclosed in Unexamined Japanese Patent Publication No. 10-76837.

However, the vehicle air conditioner of Unexamined Japanese Patent Publication No. 10-76837 has a problem that, if the component temperature-adjustment path is simply provided passing through the evaporator, the component whose temperature needs to be adjusted cannot be sufficiently cooled. This is because engine coolant having a high temperature also passes through the evaporator.

The present disclosure provides a vehicle air conditioner which has a configuration of heating coolant in a hot water heater by using a heat pump, and sufficiently cools a component whose temperature needs to be adjusted.

An exemplary embodiment of the present disclosure will be described below in detail with reference to the drawings.

Figure 1:
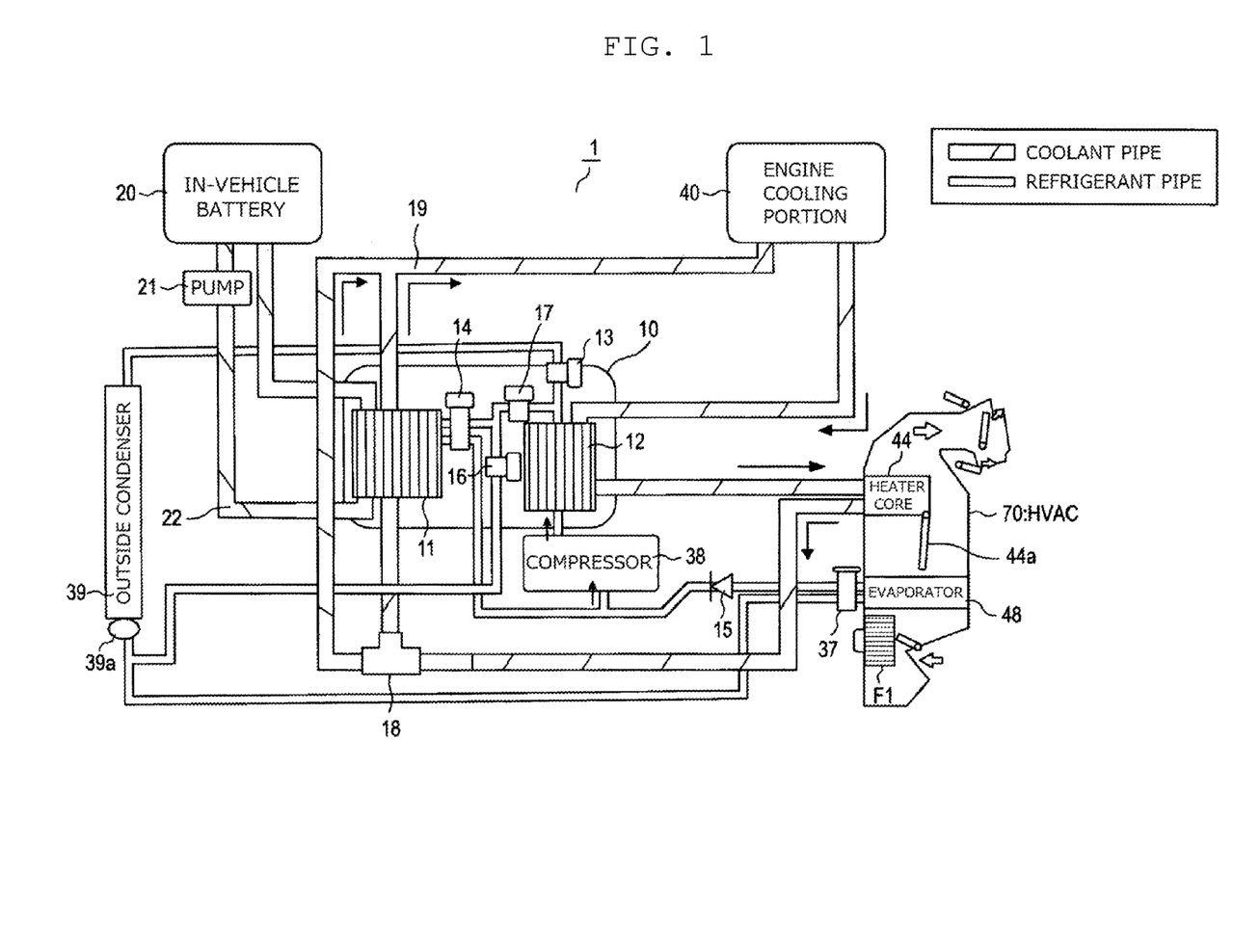
FIG. 1 is a configuration diagram of a vehicle air conditioner according to an exemplary embodiment of the present disclosure.

FIG. 1 is a configuration diagram of a vehicle air conditioner according to the exemplary embodiment of the present disclosure.

Vehicle air conditioner 1 according to the exemplary embodiment of the present disclosure is a device which is mounted on a vehicle including an engine (internal combustion engine) as a heat generating component, and adjusts air condition in the vehicle.

Vehicle air conditioner 1 according to the exemplary embodiment includes constituent unit 10, compressor (compressing machine) 38, engine cooling portion 40, heater core 44, evaporator 48, expansion valve 37, outside condenser 39, check valve 15, three-way valve 18 (corresponding to a first switch), in-vehicle battery 20, pump 21, coolant pipes which connect these components, and a refrigerant pipe. Heater core 44 and evaporator 48 are disposed in a suction air route of HVAC (Heating, Ventilation, and Air Conditioning) 70. HVAC 70 is provided with fan F1 which causes a suction air to flow.

Compressor 38 is driven by power of an engine or electricity, and compresses a suctioned refrigerant to a high-temperature and high-pressure refrigerant and discharges the refrigerant. The compressed refrigerant is fed to constituent unit 10. Compressor 38 suctions a low-pressure refrigerant through a junction pipe from evaporator 48 or first water-refrigerant heat exchanger 11 of constituent unit 10.

Engine cooling portion 40 includes a water jacket which causes a coolant to flow in surroundings of the engine, and a pump which causes the coolant to flow in the water jacket, and radiates heat from the engine to the coolant flowing in the water jacket. The pump is rotated by, for example, power of the engine. Engine cooling portion 40 may include a radiator which radiates heat to outside air when the amount of heat released from the engine is large. A coolant path (engine coolant path 19) of engine cooling portion 40 passes through constituent unit 10 and continues to heater core 44.

The engine coolant is, for example, an antifreeze liquid such as an LLC (Long Life Coolant) and is a liquid for heat transportation.

A configuration of transporting the engine coolant may include only the pump of engine cooling portion 40. Consequently, it is possible to reduce the cost of the vehicle air conditioner and reduce an installation space for the vehicle air conditioner. To enhance performance of transporting the engine coolant, a pump may be added to another portion of the coolant pipe.

Heater core 44 is a device which performs a heat exchange between an engine coolant and air, and is disposed in a suction air path of HVAC 70 which supplies air to the interior of the vehicle. Heater core 44 receives a supply of the heated engine coolant, and radiates heat on a suction air fed to the interior of the vehicle (an air-blast to the interior of the vehicle) in a heating operation. Heater core 44 can adjust the amount of air which passes according to an opening of door 44a. Door 44a can be electrically controlled to open and close. Door 44a is also referred to as a mix door.

Evaporator 48 is a device which performs a heat exchange between a low-temperature and low-temperature refrigerant and air, and is disposed in the suction air path of HVAC 70. Evaporator 48 receives a flow of a low-temperature and low-pressure refrigerant in a cooling operation or a dehumidifying operation, and cools suction air supplied to the interior of the vehicle (an air-blast to the interior of the vehicle).

Expansion valve 37 allows a high-pressure refrigerant to expand a low-temperature and low-pressure state, and discharges the refrigerant to evaporator 48. Expansion valve 37 is disposed close to evaporator 48. Expansion valve 37 may have a function of automatically adjusting the amount of refrigerant to discharge according to a temperature of a refrigerant fed from evaporator 48.

Outside condenser 39 includes a path in which a refrigerant flows and a path in which air flows, is disposed at a head of the vehicle in an engine room, and performs a heat exchange between the refrigerant and outside air. Outside condenser 39 receives a flow of a high-temperature and high-pressure refrigerant in the cooling mode and the dehumidifying mode, and releases heat from the refrigerant to outside air. Outside air is blown to outside condenser 39 by, for example, a fan. Reservoir tank 39a may be provided at a side of outside condenser 39 from which the refrigerant is fed.

The refrigerant having passed through outside condenser 39 is guided to evaporator 48 through expansion valve 37, and is also guided to constituent unit 10 by being branched.

The engine coolant having been guided from engine cooling portion 40 passes through engine coolant path 19 and is guided to constituent unit 10. The engine coolant having passed through constituent unit 10 passes through heater core 44 and is guided to three-way valve 18.

Three way valve 18 switches between a state where the engine coolant guided from heater core 44 and flowing in engine coolant path 19 flows to first water-refrigerant heat exchanger 11 included in constituent unit 10 described below, and a state where the engine coolant bypasses first water-refrigerant heat exchanger 11.

In-vehicle battery 20 is a secondary battery which accumulates electric energy which is a driving source for a driving motor of an electric vehicle or a hybrid car, for example. In-vehicle battery 20 is a component whose temperature needs to be adjusted by way of cooling. A coolant which is an antifreeze liquid such as an LLC is used to adjust the temperature of in-vehicle battery 20. This coolant passes through component temperature-adjustment path 22 and is guided to constituent unit 10. The coolant having been cooled by constituent unit 10 passes through component temperature-adjustment path 22 and is guided to in-vehicle battery 20. Pump 21 is used to circulate the coolant in component temperature-adjustment path 22. Component temperature-adjustment path 22 and engine coolant path 19 are independent paths.

Constituent unit 10 is an integrated component which is manufactured as a single unit at a factory, and is connected with other components of vehicle air conditioner 1 by pipes in a vehicle assembly process. In constituent unit 10, each component may be contained in one housing and integrated or each component may be integrated by being jointed.

Constituent unit 10 includes first water-refrigerant heat exchanger 11, second water-refrigerant heat exchanger 12, ON-OFF valve (corresponding to a second switch) 13, expansion valve 14, ON-OFF valve 16 (corresponding to the second switch), and ON-OFF valve 17 (corresponding to the second switch).

First water-refrigerant heat exchanger 11 (evaporator) includes a path in which the low-temperature and low-pressure refrigerant flows and a plurality of paths in which coolants flows, and performs a heat exchange between the refrigerant and the coolant. In first water-refrigerant heat exchanger 11, expansion valve 14 discharges the low-temperature and low-pressure refrigerant in a predetermined operation mode to transfer heat from the coolant to the low-temperature and low-pressure refrigerant. Thus, first water-refrigerant heat exchanger 11 vaporizes the low-temperature and low-pressure refrigerant.

One of coolant inlets of first water-refrigerant heat exchanger 11 is connected to heater core 44 through three-way valve 18, and one of coolant outlets is connected to an inlet of engine cooling portion 40 through engine coolant path 19.

Another one of the coolant inlets of first water-refrigerant heat exchanger 11 is connected to a coolant outlet of in-vehicle battery 20 through component temperature-adjustment path 22. Another one of the coolant outlets of first water-refrigerant heat exchanger 11 is connected to the coolant inlet of in-vehicle battery 20 through component temperature-adjustment path 22.

The refrigerant inlet of first water-refrigerant heat exchanger 11 is connected to expansion valve 14 through a pipe, and the refrigerant outlet is connected to a pipe which joins a suction port of compressor 38.

Second water-refrigerant heat exchanger 12 (condenser) includes a path in which the high-temperature and high-pressure refrigerant flows and a path in which a coolant flows, and performs a heat exchange between the refrigerant and the coolant. Second water-refrigerant heat exchanger 12 receives a flow of the high-temperature and high-pressure refrigerant fed from compressor 38 in an operation mode in which the temperature of the engine coolant is low, and releases heat from the high-temperature and high-pressure refrigerant to the coolant. When the temperature of the engine coolant is low, second water-refrigerant heat exchanger 12 condenses the high-temperature and high-pressure refrigerant.

The coolant inlet of second water-refrigerant heat exchanger 12 is connected to the outlet of engine cooling portion 40 through engine coolant path 19. The coolant outlet of second water-refrigerant heat exchanger 12 is connected to the inlet of heater core 44 through engine coolant path 19. The refrigerant inlet of second water-refrigerant heat exchanger 12 is connected to a discharge port of compressor 38 through a pipe. The refrigerant outlet of second water-refrigerant heat exchanger 12 is connected to ON-OFF valve 17 and expansion valve 14 through a branching pipe, and is also connected to outside condenser 39 through another branching pipe and ON-OFF valve 13.

Further, the refrigerant having passed through outside condenser 39 and having been guided to constituent unit 10 is connected to expansion valve 14 through ON-OFF valve 16.

ON-OFF valve 13, ON-OFF valve 16, and ON-OFF valve 17 are valves which are, for example, electrically controlled to open or close a refrigerant pipe. ON-OFF valve 13, ON-OFF valve 16, and ON-OFF valve 17 are, for example, solenoid valves. ON-OFF valve 13, ON-OFF valve 16, and ON-OFF valve 17 correspond to the second switches, and switch between a state where the refrigerant guided from second water-refrigerant heat exchanger 12 flows only to evaporator 48 among evaporator 48 and first water-refrigerant heat exchanger 11, and a state where the refrigerant flows to both of evaporator 48 and first water-refrigerant heat exchanger 11.

When ON-OFF valve 13 is opened and ON-OFF valve 16 and ON-OFF valve 17 are closed, the refrigerant flows only to evaporator 48. Further, when ON-OFF valve 17 is closed and ON-OFF valve 13 and ON-OFF valve 16 are opened, the refrigerant flows to both of evaporator 48 and first water-refrigerant heat exchanger 11.

Expansion valve 14 is a valve which functions as an expansion valve which allows the high-pressure refrigerant to expand to the low-temperature and low-pressure state.

Check valve 15 is a valve which is provided between compressor 38 and evaporator 48, and prevents a reverse flow of the refrigerant in an operation mode in which the refrigerant does not flow to outside condenser 39 and evaporator 48. In this regard, it is considered an operation mode in which ON-OFF valve 13 and ON-OFF valve 16 are closed, ON-OFF valve 17 is opened, and the refrigerant flows to a refrigerant circuit which passes through first water-refrigerant heat exchanger 11 and second water-refrigerant heat exchanger 12. In this operation mode, ON-OFF valve 13 is closed, and therefore the refrigerant circuit passing through outside condenser 39 and evaporator 48 is interrupted. However, even in this case, when the temperature of outside air is low, a refrigerant pressure in outside condenser 39 and evaporator 48 becomes low in some cases. Further, when the pressure lowers in this way, the refrigerant flowing to the refrigerant circuit passing through first water-refrigerant heat exchanger 11 and second water-refrigerant heat exchanger 12 reversely flows to the refrigerant circuit at evaporator 48. As a result, the amount of refrigerant in the refrigerant circuit passing through first water-refrigerant heat exchanger 11 and second water-refrigerant heat exchanger 12 deviates from an optimal range, and efficiency of this heat pump cycle lowers. However, check valve 15 is provided, so that it is possible to avoid such inconvenience.

Next, an operation of vehicle air conditioner 1 will be described.

Vehicle air conditioner 1 operates by being switched to some operation modes such as a hot water heating mode, a heat pump heating mode, a temperature-adjusting mode, and a cooling mode. The hot water heating mode is a mode of heating the interior of the vehicle without operating the heat pump. The heat pump heating mode is a mode of heating the interior of the vehicle by operating the heat pump. The cooling mode is a mode of cooling the interior of the vehicle by an operation of the heat pump. Further, it is also possible to select a temperature adjusting mode of adjusting the temperature and the humidity of air by optionally cooling and dehumidifying air by using the low-temperature refrigerant, and heating air by using the high-temperature coolant. A cooling mode will be described as a typical example below.

[Cooling Mode]

Figure 2:
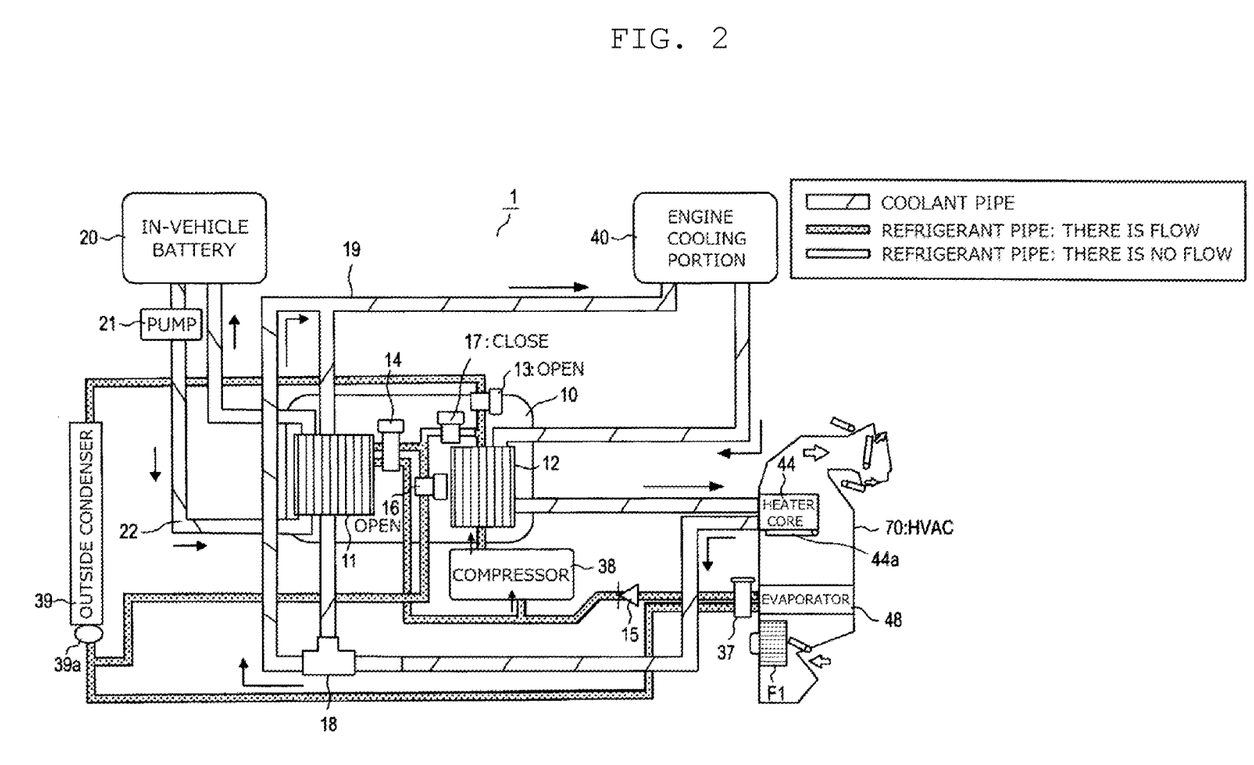
FIG. 2 is a diagram for illustrating an operation of a cooling mode.

FIG. 2 is a diagram for illustrating an operation of the cooling mode. According to the cooling mode, as illustrated in FIG. 2, ON-OFF valve 13 is switched to open, ON-OFF valve 16 is switched to open and ON-OFF valve 17 is switched to close. Further, door 44*a* of heater core 44 is fully closed.

When compressor 38 operates, the refrigerant circulates in order of second water-refrigerant heat exchanger 12, outside condenser 39, expansion valve 37, evaporator 48, and compressor 38. Further, the refrigerant discharged by compressor 38 circulates in order of second water-refrigerant heat exchanger 12, outside condenser 39, ON-OFF valve 16, expansion valve 14, first water-refrigerant heat exchanger 11, and compressor 38.

In the cooling mode, three-way valve 18 (first switch) is switched such that the engine coolant guided from heater core 44 and flowing in engine coolant path 19 bypasses first water-refrigerant heat exchanger 11.

When the engine coolant bypasses first water-refrigerant heat exchanger 11 by three-way valve 18, only the coolant having been guided from in-vehicle battery 20 passes through first water-refrigerant heat exchanger 11. This coolant is cooled when passing through first water-refrigerant heat exchanger 11.

The engine coolant flowing in engine coolant path 19 has a relatively high temperature because it is not cooled due to bypassing. Heat is radiated from the coolant mainly by a radiator of engine cooling portion 40. Because the temperature of the engine becomes very high, even when the temperature of outside air is high, it is possible to adequately cool the interior of the vehicle by heat radiation from the radiator. In a configuration in which the coolant flows, a more coolant may flow to the radiator in order to lower a flow at heater core 44.

An amount of heat radiation from the high-temperature and high-pressure refrigerant is not large in second water-refrigerant heat exchanger 12, because the temperature of the coolant of second water-refrigerant heat exchanger 12 becomes high. Accordingly, the high-temperature and high-pressure refrigerant is fed to outside condenser 39, and then condenses by radiating heat to air in outside condenser 39.

The condensed refrigerant is fed toward evaporator 48. The refrigerant, at first, expands at expansion valve 37 to become a low-temperature and low-pressure refrigerant, and cools an air-blast to the interior of the vehicle at evaporator 48. The refrigerant is vaporized by this heat exchange. The vaporized low-pressure refrigerant is suctioned and compressed by compressor 38.

The temperature of the coolant flowing in second water-refrigerant heat exchanger 12, heater core 44, and first water-refrigerant heat exchanger 11 becomes high. However, an amount of heat radiation to suction air fed to the interior of the vehicle can be adjusted by adjusting an opening of door 44*a* of heater core 44.

According to this operation, it is possible to sufficiently cool the interior of the vehicle.

As described above, vehicle air conditioner 1 according to the present exemplary embodiment employs a basic configuration including a configuration of a hot water heater which causes an engine coolant to flow in heater core 44 to use for heating, and a configuration of a heat pump cooler which uses a low-temperature and low-pressure refrigerant of the heat pump for cooling. Further, by adding constituent unit 10 to this basic configuration, it possible to warm the interior of the vehicle by using the heat pump. With this configuration, even when the temperature of the engine is low, the operation of the heat pump makes it possible to quickly warm the interior of the vehicle with small energy.

According to the present exemplary embodiment, it is possible to employ a basic configuration including a hot water heater which is adopted for a conventional vehicle, and a heat pump cooler which is adopted for a conventional vehicle, and sufficiently cool a component (in-vehicle battery 20) whose temperature needs to be adjusted by allowing the engine coolant to bypass by using three-way valve (first switch) 18.

[Heat Pump Heating Mode]

Next, an operation of a heat pump heating mode will be described.

In the heat pump heating mode, ON-OFF valve 13 is switched to close, ON-OFF valve 16 is switched to close, and ON-OFF valve 17 is switched to open. Further, door 44a of heater core 44 is opened (fully opened, for example).

ON-OFF valve 13 (second switch) can switch between a state where the refrigerant fed from second water-refrigerant heat exchanger 12 is fed to evaporator 48 and a state where the refrigerant is not fed to evaporator 48. ON-OFF valve 17 (second switch) can switch between a state where the refrigerant fed from second water-refrigerant heat exchanger 12 is fed to first water-refrigerant heat exchanger 11 and a state where the refrigerant is not fed to first water-refrigerant heat exchanger 11.

Further, when compressor 38 operates, the refrigerant discharged by compressor 38 circulates in order of second water-refrigerant heat exchanger 12, expansion valve 14, first water-refrigerant heat exchanger 11, and compressor 38.

Thus, ON-OFF valve 13, ON-OFF valve 16, and ON-OFF valve 17 (second switches) can switch at least between a state of the cooling mode where the refrigerant flows to a circulation route including second water-refrigerant heat exchanger 12, outside condenser 39, evaporator 48, and compressor 38, and the refrigerant does not flow to first water-refrigerant heat exchanger 11, and a state of the heat pump heating mode where the refrigerant flows to a circulation route including second water-refrigerant heat exchanger 12, first water-refrigerant heat exchanger 11, and compressor 38.

When ON-OFF valve 13, ON-OFF valve 16, and ON-OFF valve 17 switch to the state of the heat pump heating mode, it is possible to switch three-way valve 18 (first switch) to a state where the engine coolant flows to first water-refrigerant heat exchanger 11 (does not bypass). Consequently, it is possible to realize heating by absorbing heat from both of the engine coolant flowing in engine coolant path 19 and the coolant flowing in component temperature-adjustment path 22.

MODIFIED EXAMPLE

Figure 3:
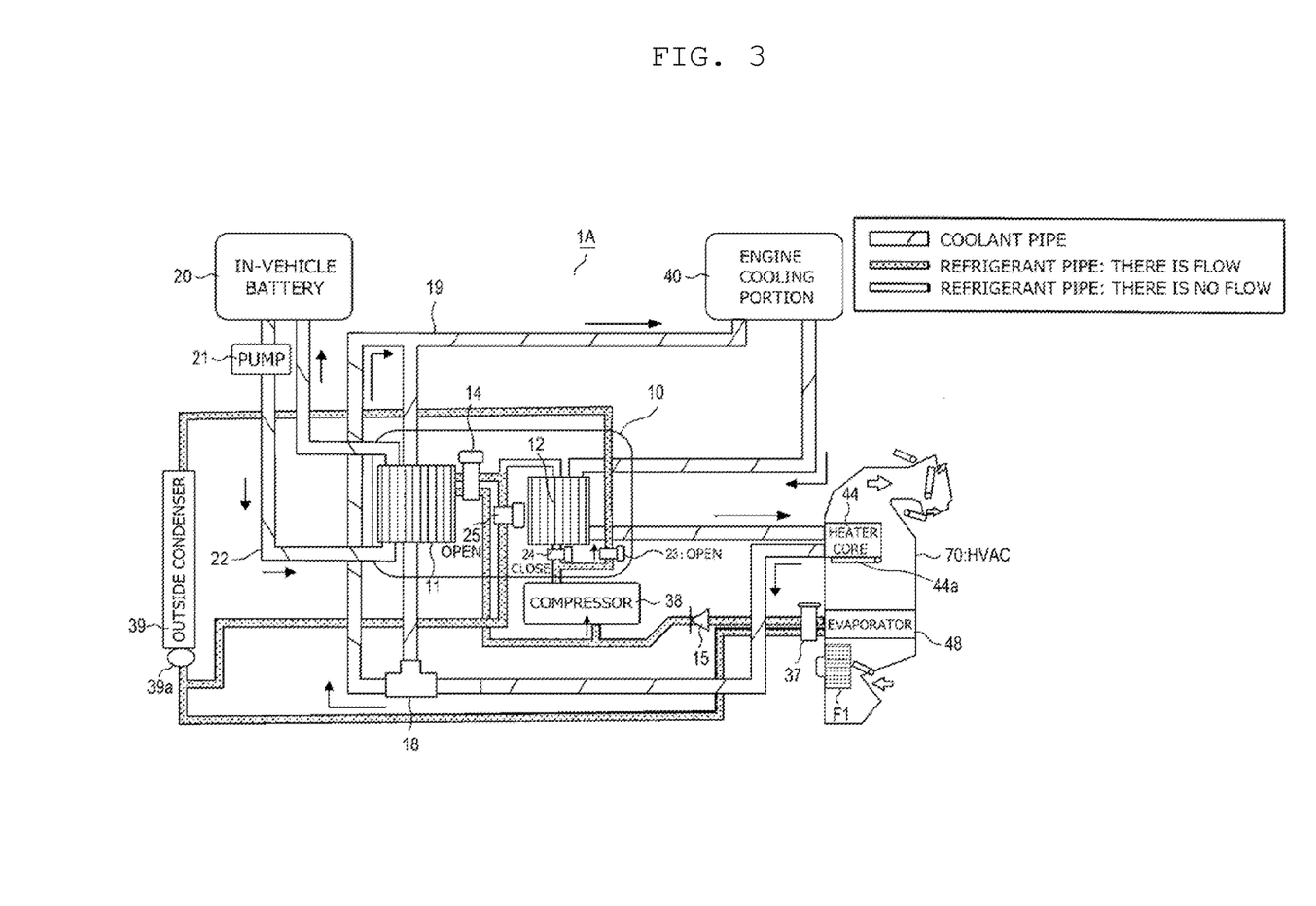
FIG. 3 is a configuration diagram of a vehicle air conditioner according to a modified example of the exemplary embodiment of the present disclosure.

FIG. 3 is a configuration diagram of a vehicle air conditioner according to the modified example of the exemplary embodiment of the present disclosure.

According to this modified example, a change in a refrigerant path is added to the configuration of the exemplary embodiment in FIG. 1. The same components as those components in FIG. 1 will be assigned the same reference numerals and outside condenser 39 will not be described in detail.

In FIG. 1, ON-OFF valve 13, ON-OFF valve 16, and ON-OFF valve 17 switch between a state where the refrigerant fed from second water-refrigerant heat exchanger 12 flows only to evaporator 48 among evaporator 48 and first water-refrigerant heat exchanger 11, and a state where the refrigerant flows to both of evaporator 48 and first water-refrigerant heat exchanger 11. By contrast with this, in vehicle air conditioner 1A according to the modified example, ON-OFF valve 23, ON-OFF valve 24, and ON-OFF valve 25 (second switches) switch between a state where a refrigerant branched from a refrigerant discharged by compressor 38 to be guided to second water-refrigerant heat exchanger 12 flows only to evaporator 48 among evaporator 48 and first water-refrigerant heat exchanger 11, and a state where the refrigerant flows to both of evaporator 48 and first water-refrigerant heat exchanger 11.

More specifically, a discharge port of compressor 38 is connected to ON-OFF valve 24, and is connected to ON-OFF valve 23 through a branching pipe. The refrigerant inlet of second water-refrigerant heat exchanger 12 is connected to a discharge port of compressor 38 through ON-OFF valve 24. The refrigerant outlet of second water-refrigerant heat exchanger 12 is connected to a refrigerant inlet of first water-refrigerant heat exchanger 11 through expansion valve 14. The refrigerant outlet of first water-refrigerant heat exchanger 11 is connected to a pipe which joins a suction port of compressor 38. ON-OFF valve 25 plays the same role as ON-OFF valve 16 in FIG. 1.

Further, the discharge port of compressor 38 is connected to a refrigerant inlet of outside condenser 39 through a branching pipe and ON-OFF valve 23 in order. Thus, a refrigerant path from second water-refrigerant heat exchanger 12 to first water-refrigerant heat exchanger 11, and a refrigerant path from outside condenser 39 to evaporator 48 are different refrigerant paths.

In the cooling mode, as illustrated in FIG. 3, ON-OFF valve 23 is switched to open, ON-OFF valve 24 is switched to open, and ON-OFF valve 25 is switched to close. Further, door 44a of heater core 44 is fully closed.

When compressor 38 operates, the refrigerant circulates in order of outside condenser 39, expansion valve 37, evaporator 48, and compressor 38. Further, the refrigerant discharged by compressor 38 circulates in order of outside condenser 39, ON-OFF valve 25, expansion valve 14, first water-refrigerant heat exchanger 11, and compressor 38.

In the cooling mode, three-way valve 18 (first switch) is switched such that the engine coolant guided from heater core 44 and flowing in engine coolant path 19 bypasses first water-refrigerant heat exchanger 11.

Thus, similar to FIG. 1, in the modified example in FIG. 3, when a state is switched to the state where the refrigerant of the heat pump flows to both of evaporator 48 and first water refrigerant heater exchanger 11, it is possible to switch three-way valve 18 to a state where the engine coolant bypasses first water-refrigerant heat exchanger 11.

Further, in the heat pump heating mode, ON-OFF valve 23 is switched to close, ON-OFF valve 24 is switched to open, and ON-OFF valve 25 is switched to close. Furthermore, door 44a of heater core 44 is opened (fully opened, for example).

Still further, when compressor 38 operates, the refrigerant discharged by compressor 38 circulates in order of second water-refrigerant heat exchanger 12, expansion valve 14, first water-refrigerant heat exchanger 11, and compressor 38.

When ON-OFF valve 23, ON-OFF valve 24, and ON-OFF valve 25 (second switches) switch to the state of the heat pump heating mode, it is possible to switch three-way valve 18 (first switch) to a state where the engine coolant flows to first water-refrigerant heat exchanger 11 (does not bypass). Consequently, it is possible to realize heating by absorbing heat from both of the engine coolant flowing in engine coolant path 19 and the coolant flowing in component temperature-adjustment path 22.

Thus, ON-OFF valve 23, ON-OFF valve 24, and ON-OFF valve 25 (second switches) can switch to a state where a refrigerant flows to a refrigerant circuit including compressor 38, second water-refrigerant heat exchanger 12, and first water-refrigerant heat exchanger 11. In this case, a refrigerant path from second water-refrigerant heat exchanger 12 to first water-refrigerant heat exchanger 11, and a refrigerant path from outside condenser 39 to evaporator 48 are different refrigerant paths.

As described above, in vehicle air conditioner 1A according to the modified example, ON-OFF valve 23, ON-OFF valve 24, and ON-OFF valve 25 (second switches) can switch between a state where a refrigerant flows to a refrigerant circuit including compressor 38, second water-refrigerant heat exchanger 12, and first water-refrigerant heat exchanger 11, and a state where the refrigerant flows to a refrigerant circuit including compressor 38, outside condenser 39, and evaporator 48. Further, in vehicle air conditioner 1A according to the modified example, a refrigerant path from second water-refrigerant heat exchanger 12 to first water-refrigerant heat exchanger 11, and a refrigerant path from outside condenser 39 to evaporator 48 are different refrigerant paths.

Furthermore, ON-OFF valve 23, ON-OFF valve 24, and ON-OFF valve 25 can switch to a state where a refrigerant flows to a refrigerant circuit including compressor 38, second water-refrigerant heat exchanger 12, and first water-refrigerant heat exchanger 11 in the heat pump heating mode, and switch to a state where the refrigerant flows to a refrigerant circuit including compressor 38, outside condenser 39, and evaporator 48 in the cooling mode.

It is possible to provide the following effect by employing the configuration illustrated in FIG. 3. The refrigerant path from second water-refrigerant heat exchanger 12 to first water-refrigerant heat exchanger 11, and the refrigerant path from outside condenser 39 to evaporator 48 are different. Consequently, it is possible to tune the refrigerant paths differently according to a plurality of operation modes in order to match a plurality of operation modes (e.g. the cooling mode and the heat pump heating mode). Furthermore, vehicle air conditioner 1A according to the modified example includes expansion valve 14 which expands a refrigerant before the refrigerant reaches first water-refrigerant heat exchanger 11, and expansion valve 37 which expands the refrigerant before the refrigerant reaches evaporator 48. Consequently, it is possible to tune the expansion valve differently according to a plurality of different operation modes in order to match a plurality of operation modes.

According to the modified example, a heat exchange is performed between air and a refrigerant in the cooling mode, and a heat exchange is performed between a coolant and a refrigerant in a heat pump heating mode. However, it is possible to perform tuning according to a plurality of operation modes, and consequently it is possible to exhibit operation performance dedicated to each operation mode. Further, it is possible to smoothly switch an operation mode. Furthermore, there is a problem described below when the refrigerant path from second water-refrigerant heat exchanger 12 to first water-refrigerant heat exchanger 11, and the refrigerant path from outside condenser 39 to evaporator 48 are partially common. In this configuration, it is difficult to collect the refrigerant since the refrigerant accumulates in outside condenser 39 upon switching of the operation mode, and the amount of refrigerant becomes unstable. However, vehicle air conditioner 1A according to the modified example hardly causes such a problem.

The exemplary embodiment of the present disclosure has been described above.

In addition, a configuration where three-way valve 18 adopted as the first switch has been described as an example in the above exemplary embodiment. However, it is possible to realize the function of three-way valve 18 by a plurality of ON-OFF valves disposed at a branching portion of the refrigerant pipes.

A configuration where three-way valve 18 is provided outside constituent unit 10 has been described as an example in the above exemplary embodiment. However, three-way valve 18 may be provided inside constituent unit 10.

Further, a configuration where ON-OFF valve 13, ON-OFF valve 16, and ON-OFF valve 17 are adopted as the second switches has been described as an example in the above exemplary embodiment. However, it is possible to realize this configuration by the three-way valve disposed at a branching portion of the refrigerant pipes.

Further, the in-vehicle battery has been described as an example of a component of the vehicle whose temperature needs to be adjusted in the above exemplary embodiment. However, the component of the vehicle whose temperature needs to be adjusted may adopt various components whose temperatures need to be adjusted such as an electric motor of an electric vehicle for driving.

Disclosures of the specification, the drawings and the abstract included in Japanese Patent Application No. 2013-155184 filed on Jul. 26, 2013, are entirely incorporated in this application.

The present disclosure can be used for a vehicle air conditioner which is mounted on various vehicles such as engine cars, electric vehicles or HEV on which a component whose temperature needs to be adjusted is mounted.

The invention claimed is:

1. A vehicle air conditioner comprising:
   a component temperature-adjustment path in which a coolant flows for performing a heat exchange with a vehicle component which needs a temperature adjustment;
   an engine coolant path in which an engine coolant guided from an engine cooling portion flows;
   a heater core, in which the engine coolant flowing in the engine coolant path flows, for heating air to be fed to an interior of the vehicle;
   a first water-refrigerant heat exchanger which performs a heat exchange between a low-temperature and low-pressure refrigerant of a heat pump and the coolant flowing in the component temperature-adjustment path, and between the low-temperature and low-pressure refrigerant of the heat pump and the engine coolant flowing in the engine coolant path;
   a second water-refrigerant heat exchanger which performs a heat exchange between a high-temperature and high-pressure refrigerant of the heat pump, and the engine coolant flowing in the engine coolant path;
   a first switch which can switch between a state where the engine coolant flowing in the engine coolant path flows to the first water-refrigerant heat exchanger and a state where the refrigerant bypasses the first water-refrigerant heat exchanger;
   an evaporator, in which the refrigerant of the heat pump flows, for cooling the air to be fed to the interior of the vehicle; and
   a second switch which can switch at least between a state of a cooling mode where the refrigerant flows to a circulation route including the second water-refrigerant heat exchanger, a condenser which releases heat from the high-temperature and high-pressure refrigerant to outside air and condenses the refrigerant, the evaporator, and a compressor which compresses the refrigerant, and the refrigerant does not flow to the first water-refrigerant heat exchanger, and a state of a heat pump heating mode where the refrigerant flows to a circulation route including the second water-refrigerant heat exchanger, the first water-refrigerant heat exchanger, and the compressor, wherein the engine coolant path is configured to allow the engine coolant to flow from the engine cooling portion and to return to the engine cooling portion via the second water-refrigerant heat exchanger, the heater core, and the first water-refrigerant heat exchanger in this order.

2. The vehicle air conditioner according to claim 1, wherein the component temperature-adjustment path and the engine coolant path are independent with each other.

3. The vehicle air conditioner according to claim 1, wherein, when the second switch switches to the state where the refrigerant of the heat pump flows to both of the evaporator and the first water-refrigerant heat exchanger, the first switch switches to the state where the engine coolant bypasses the first water-refrigerant heat exchanger.

4. The vehicle air conditioner according to claim 1, wherein, when the second switch switches to the state of the heat pump heating mode, the first switch switches to a state where the engine coolant flows to the first water-refrigerant heat exchanger.

5. The vehicle air conditioner according to claim 1, further comprising a check valve disposed on a path in which the refrigerant flows from the evaporator to the compressor.

6. The vehicle air conditioner according to claim 1, further comprising:
a first expander which expands the refrigerant fed from the second water-refrigerant heat exchanger, and then feeds the refrigerant to the first water-refrigerant heat exchanger, and
a second expander which expands the refrigerant condensed by the condenser to a low-temperature and low-pressure state, and then discharges the refrigerant to the evaporator.

7. The vehicle air conditioner according to claim 1, wherein
when the first switch is in the state where the engine coolant flows to the first water-refrigerant heat exchanger, the engine coolant flows in order of the engine cooling portion, the second water-refrigerant heat exchanger, the heater core, the first switch, and the first water-refrigerant heat exchanger, and returns to the engine cooling portion, and
when the first switch is in the state where the refrigerant bypasses the first water-refrigerant heat exchanger, the engine coolant flows in order of the engine cooling portion, the second water-refrigerant heat exchanger, the heater core, and the first switch, and returns to the engine cooling portion.

8. The vehicle air conditioner according to claim 1, wherein
the second switch can switch between a state where the refrigerant flows to a refrigerant circuit including a compressor which compresses the refrigerant, the second water-refrigerant heat exchanger, and the first water-refrigerant heat exchanger, and a state where the refrigerant flows to a refrigerant circuit including the compressor, a condenser which releases heat from the high-temperature and high-pressure refrigerant to outside air and condenses the refrigerant, and the evaporator, and a refrigerant path from the second water-refrigerant heat exchanger to the first water-refrigerant heat exchanger is different from a refrigerant path from the condenser to the evaporator.

9. The vehicle air conditioner device according to claim 8, wherein the second switch switches to a state where the refrigerant flows to the refrigerant circuit including the compressor, the second water-refrigerant heat exchanger, and the first water-refrigerant heat exchanger in a heat pump heating mode, and switches to a state where the refrigerant flows to the refrigerant circuit including the compressor, the condenser, and the evaporator in a cooling mode.

10. The vehicle air conditioner according to claim 9, wherein, when the second switch switches to the state of the heat pump heating mode, the first switch switches to a state where the engine coolant flows to the first water-refrigerant heat exchanger.

11. The vehicle air conditioner according to claim 9, further comprising a check valve disposed on a path in which the refrigerant flows from the evaporator to the compressor.

12. The vehicle air conditioner according to claim 9, further comprising:
a first expander which expands the refrigerant fed from the second water-refrigerant heat exchanger, and then feeds the refrigerant to the first water-refrigerant heat exchanger, and
a second expander which expands the refrigerant condensed by the condenser to a low-temperature and low-pressure refrigerant, and then discharges the refrigerant to the evaporator.

13. A vehicle air conditioner comprising:
a component temperature-adjustment path in which a coolant flows for performing a heat exchange with a vehicle component which needs a temperature adjustment;
an engine coolant path in which an engine coolant guided from an engine cooling portion flows;
a heater core, in which the engine coolant flowing in the engine coolant path flows, for heating air to be fed to an interior of the vehicle;
a first water-refrigerant heat exchanger which performs a heat exchange between a low-temperature and low-pressure refrigerant of a heat pump and the coolant flowing in the component temperature-adjustment path, and between the low-temperature and low-pressure refrigerant of the heat pump and the engine coolant flowing in the engine coolant path;
a second water-refrigerant heat exchanger which performs a heat exchange between a high-temperature and high-pressure refrigerant of the heat pump, and the engine coolant flowing in the engine coolant path;
a first switch which can switch between a state where the engine coolant flowing in the engine coolant path flows to the first water-refrigerant heat exchanger and a state where the refrigerant bypasses the first water-refrigerant heat exchanger,
wherein the engine coolant path is configured to allow the engine coolant to flow from the engine cooling portion and to return to the engine cooling portion via the second water-refrigerant heat exchanger, the heater core, and the first water-refrigerant heat exchanger in this order,
an evaporator, in which the refrigerant of the heat pump flows, for cooling the air to be fed to the interior of the vehicle; and a second switch which can switch between a state where the refrigerant of the heat pump flows only to the evaporator, and a state where the refrigerant of the heat pump flows to both of the evaporator and the first water-refrigerant heat exchanger, and wherein the second switch can switch between a state where the refrigerant fed from the second water-refrigerant heat exchanger is fed to the evaporator and a state where the refrigerant is not fed to the evaporator, and can switch between a state where the refrigerant fed from the second water-refrigerant heat exchanger is fed to the first water-refrigerant heat exchanger and a state where the refrigerant is not fed to the first water-refrigerant exchanger.

14. A vehicle air conditioner comprising:

a component temperature-adjustment path in which a coolant flows for performing a heat exchange with a vehicle component which needs a temperature adjustment;

an engine coolant path in which an engine coolant guided from an engine cooling portion flows;

a heater core, in which the engine coolant flowing in the engine coolant path flows, for heating air to be fed to an interior of the vehicle;

a first water-refrigerant heat exchanger which performs a heat exchange between a low-temperature and low-pressure refrigerant of a heat pump and the coolant flowing in the component temperature-adjustment path, and between the low-temperature and low-pressure refrigerant of the heat pump and the engine coolant flowing in the engine coolant path;

a second water-refrigerant heat exchanger which performs a heat exchange between a high-temperature and high-pressure refrigerant of the heat pump, and the engine coolant flowing in the engine coolant path; and a first switch which can switch between a state where the engine coolant flowing in the engine coolant path flows to the first water-refrigerant heat exchanger and a state where the refrigerant bypasses the first water-refrigerant heat exchanger, wherein the engine coolant path is configured to allow the engine coolant to flow from the engine cooling portion and to return to the engine cooling portion via the second water-refrigerant heat exchanger, the heater core, and the first water-refrigerant heat exchanger in this order, and wherein when the first switch is in the state where the engine coolant flows to the first water-refrigerant heat exchanger, the engine coolant flows in order of the engine cooling portion, the second water-refrigerant heat exchanger, the heater core, the first switch, and the first water-refrigerant heat exchanger, and returns to the engine cooling portion, and when the first switch is in the state where the refrigerant bypasses the first water-refrigerant heat exchanger, the engine coolant flows in order of the engine cooling portion, the second water-refrigerant heat exchanger, the heater core, and the first switch, and returns to the engine cooling portion.

* * * * *